A. A. SMITH.
BAG HOLDER.
APPLICATION FILED JAN. 9, 1908.
900,221.
Patented Oct. 6, 1908.
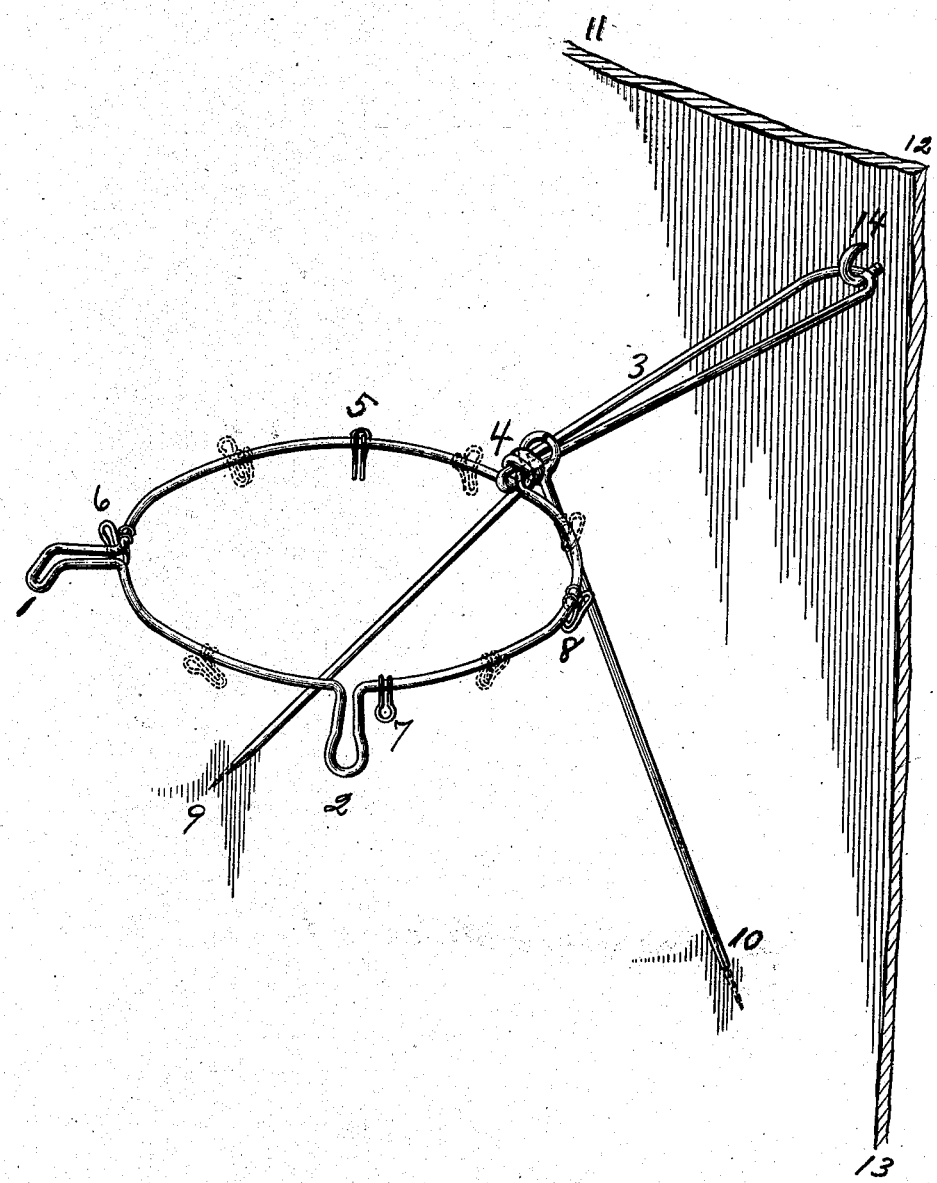
Witnesses:
Inventor:
Adele A. Smith

UNITED STATES PATENT OFFICE.

ADELE A. SMITH, OF CHICAGO, ILLINOIS.

BAG-HOLDER.

No. 900,221. Specification of Letters Patent. Patented Oct. 6, 1908.

Application filed January 9, 1908. Serial No. 410,066.

*To all whom it may concern:*

Be it known that I, ADELE A. SMITH, of Chicago, county of Cook, and State of Illinois, have invented certain new and useful Improvements in Bag-Holders, of which the following is a specification.

My object is to construct a fruit juice bag holder that can be used with bags or cloths for the straining of juices, jellies, puddings or any liquid substances into jars or other receptacles, and which can be used on top of receptacles or attached to a wall and left stationary, the device saving the burning and staining of hands, which has always accompanied the straining of juices in the old way.

To attain these objects I have invented the herein described bag holder which is constructed as follows: Out of one solid piece of wire is made a long handle, the wire circle with two prongs 1 and 2 equidistant from a point in the circumference directly opposite the handle 3. Each prong is an extension of wire out from the circle and then down then up again and back to circle, as illustrated, the object being to give three props for the holder to rest on when placed over jar, the handle is long and the prongs turn down, thus making it impossible for holder resting on them to slip down into the jar.
The handle is an extension of the same wire out from circle to the length of diameter of circle plus length of prong, then arch end of handle and return to point where handle diverged from circle, where it passes once around the other end of wire, extending back the length of the width of wire, as at 4. The aforesaid other end passes two and one half times around both wires of handle as close as possible to circle. At four points on the circle are attached hooks, Nos. 5, 6, 7, 8, so placed relatively that if lines connected each with two nearest, said lines would form the sides of a perfect inscribed square those sides would be parallel and other two at right angles with a line passing lengthwise through handle and continued through circle. These hooks are double, the two ends of wire of which they are made, passing around wire circle, and held firmly in place by the tightness with which they are entwined, and also further strengthened by the coating of plating. The object of hooks is to hang bag or cloth upon. The number of hooks is still further increased by placing one between prongs one between the hooks on each side, and one on each side of handle, midway between handle and nearest hook on each side. It is obvious that the number of hooks may be increased or diminished, as mechanical skill or caprice of the manufacturer may dictate.

When it is desired to attach bag holder to wall a screw eye or hook is screwed into wall and attached to end of handle: also a plier brace about twice the length of handle with long ends bended and sharpened so as to stick into wall, the small ends being curved, each forming a half circle, half the circumference of handle close to circle of holder, so that when closed together they take firm hold of handle. This brace works like a pair of scissors, so that when long ends are extended and stuck into the wall the short circular ends have a firm grip on handle.

Having described my invention I claim as new and wish to protect by Letters Patent,—

A device of the character described comprising a wire bent to form an elongated handle portion and an annular body portion integral with said handle portion said body portion having outwardly and downwardly projecting members upon which the device is adapted to rest in combination with a brace member comprising two pointed members pivotally connected to each other, the lower pointed ends of said members being adapted to stick into a wall or like support and the upper ends of said members being bent to form handle engaging portions.

ADELE A. SMITH.

Witnesses:
 D. DOUBT,
 T. O. THOMPSON.